(No Model.)
J. E. WELLING.
WATER COOLER.
No. 298,140. Patented May 6, 1884.
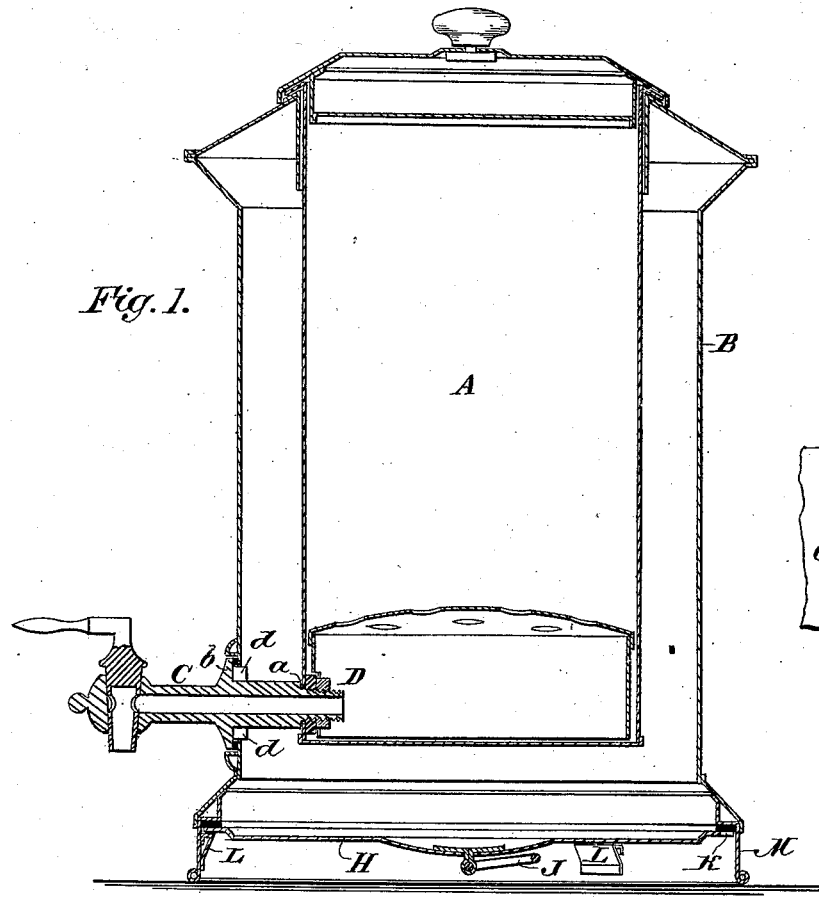
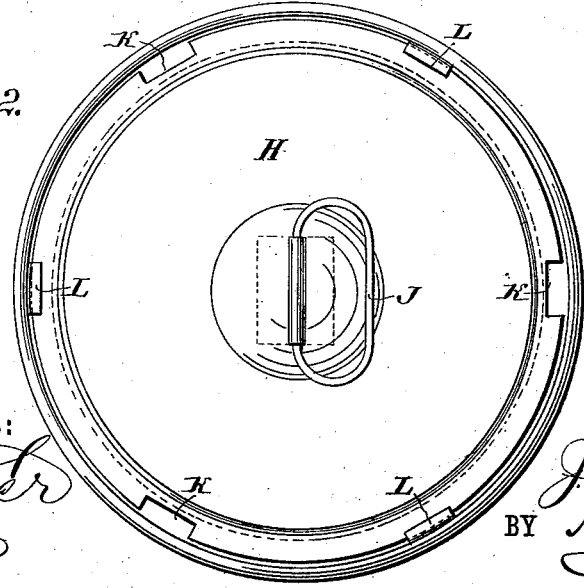
WITNESSES:
Ho Berger
C. Sedgwick
INVENTOR:
J. E. Welling
BY Munn &Co
ATTORNEYS.

UNITED STATES PATENT OFFICE.

JOHN EDWARD WELLING, OF GEORGETOWN, KENTUCKY, ASSIGNOR TO HIMSELF AND JUSTICE WEBB, OF SAME PLACE.

WATER-COOLER.

SPECIFICATION forming part of Letters Patent No. 298,140, dated May 6, 1884.

Application filed March 5, 1884. (No model.)

*To all whom it may concern:*

Be it known that I, JOHN E. WELLING, of Georgetown, in the county of Scott and State of Kentucky, have invented a new and Improved Water-Cooler, of which the following is a full, clear, and exact description.

The object of my invention is to provide certain new and useful improvements in water-coolers, and especially in the manner of holding the faucet.

This invention, which is an improvement on the water-cooler for which Letters Patent No. 291,857 were issued to me January 8, 1884, consists in the combination, with the water-tank and its casing, of a faucet provided with two shoulders adapted to rest against the outer surface of the tank and the casing.

Reference is to be had to the accompanying drawings, forming part of this specification, in which similar letters of reference indicate corresponding parts in all the figures.

Figure 1 is a longitudinal sectional elevation of a water-cooler provided with my improvements. Fig. 2 is an inverted plan view of the bottom. Fig. 3 is a detail face view of part of the casing, showing the aperture for the faucet.

The removable water-tank A is held in the casing or shell B, and the space between the same is filled in with some suitable non-conductor of heat, such as sawdust, mineral wool, &c. The faucet C is passed through an aperture, E, in the shell B, and through an aperture in the water-tank A, the inner end of the faucet projecting into the lower part of the said tank A. The faucet is provided with an annular shoulder, a, which rests against the outer surface of the tank A, and is pressed firmly against it by a nut, D, screwed on the inner end of the faucet and drawn up tightly. The faucet is also provided with an additional shoulder, b, or annular ridge, which fits against the outer surface of the shell, and on the back of which shoulder two lugs, d, are formed, which pass into notches g in the edge of the aperture E in the shell or casing B, and thus prevent the faucet from turning. Washers are placed between the shoulders a and b and the corresponding surfaces of the tank A and shell B, and by drawing the nut D up tightly close joints are formed between the faucet and the shell B and tank. The casing or shell B is provided with a removable bottom, H, having a folding handle, J, on the middle on its under surface. The bottom H is provided in its edge with a series of notches, K, and the base M of the casing A is provided on the inner surface with a corresponding number of lugs or projections, L. To secure the bottom H on the bottom of the cooler, it is placed in the lower part of the shell or casing A in such a manner that the lugs or projections L pass into the notches K, and then the bottom is turned in such a manner that those parts of the rim of the bottom between the notches pass over the lugs or projections L, thus holding the bottom. After the water-tank A has been secured in the shell or casing the said shell or casing is inverted, the space between the casing and the water-tank is filled with sawdust, mineral wool, or any other non-conductor of heat, and the bottom H is fastened in place in the manner described.

Having thus described my invention, I claim as new and desire to secure by Letters Patent—

1. In a water-cooler, the combination, with the casing B and the water-tank A, of the faucet C, having its inner end screw-threaded and extended into the water-tank, and provided with the shoulder a resting against the outer surface of the tank, and the shoulder b, resting against the outer surface of the casing, and the nut D on the inner screw-threaded end of the faucet, substantially as herein shown and described.

2. In a water-cooler, the combination, with the shell or casing B and the water-tank A, of the faucet C, having the shoulders a b, and having lugs d on the shoulder b, which lugs fit in notches g in the edges of the aperture in the casing A, substantially as herein shown and described.

JOHN EDWARD WELLING.

Witnesses:
W. T. SHEPARD,
F. P. THOMPSON.